United States Patent [19]

Jue

[11] 4,044,472
[45] Aug. 30, 1977

[54] SHRUB TRIMMING GUIDE

[76] Inventor: John Jue, 141 Connemara Way, Sunnyvale, Calif. 94087

[21] Appl. No.: 648,222

[22] Filed: Jan. 12, 1976

Related U.S. Application Data

[63] Continuation of Ser. No. 510,104, Sept. 27, 1974, abandoned.

[51] Int. Cl.² ............................................... G01B 3/14
[52] U.S. Cl. .................................... 33/174 G; 33/177
[58] Field of Search ....................... 33/174 F, 176, 177

[56] References Cited

U.S. PATENT DOCUMENTS

| 865,586 | 9/1907 | Healley | 33/177 |
|---|---|---|---|
| 1,690,540 | 11/1928 | Klein | 33/177 |
| 2,478,081 | 8/1949 | Beets | 33/174 G |
| 2,679,691 | 6/1954 | Brownell | 33/174 G |
| 2,883,756 | 4/1959 | Caldwell | 33/174 G |

FOREIGN PATENT DOCUMENTS

| 29,818 | 12/1884 | Germany | 33/177 |
|---|---|---|---|
| 486,551 | 11/1953 | Italy | 33/174 G |
| 2,990 | 8/1914 | United Kingdom | 33/177 |

Primary Examiner—Richard E. Aegerter
Assistant Examiner—Richard R. Stearns
Attorney, Agent, or Firm—Townsend and Townsend

[57] ABSTRACT

A guide for use in determining the amount of growth to be trimmed from the outer peripheral margins of a plant, such as a garden shrub or the like. The guide includes an elongated, resilient member which can be bent along its length so that the member can assume any one of a number of different configurations defining the outline of the outer periphery of a plant to be trimmed. The member is stored in a housing such that only that length member required is dispensed, allowing the guide to be adjustable to perform on a wide range of plant sizes. First means coupled with the normally lowermost end of the member positions the latter near the lower margin of the outer periphery of the plant and second means near the normally uppermost end of the member positions the member near the upper margin of the plant. The second means includes structure for securing the upper end of the member at any one of a number of different angles with respect to the vertical so that the member itself assumes a desired configuration. In a preferred embodiment, a shaft interconnects the first means and the second means in addition to housing the member and a number of embodiments of the second means are disclosed.

This invention relates to the trimming of plants, such as garden shrubs or the like and, more particularly, to a guide for use in determining the desired shape and amount of growth to be removed from a plant to be trimmed.

13 Claims, 8 Drawing Figures

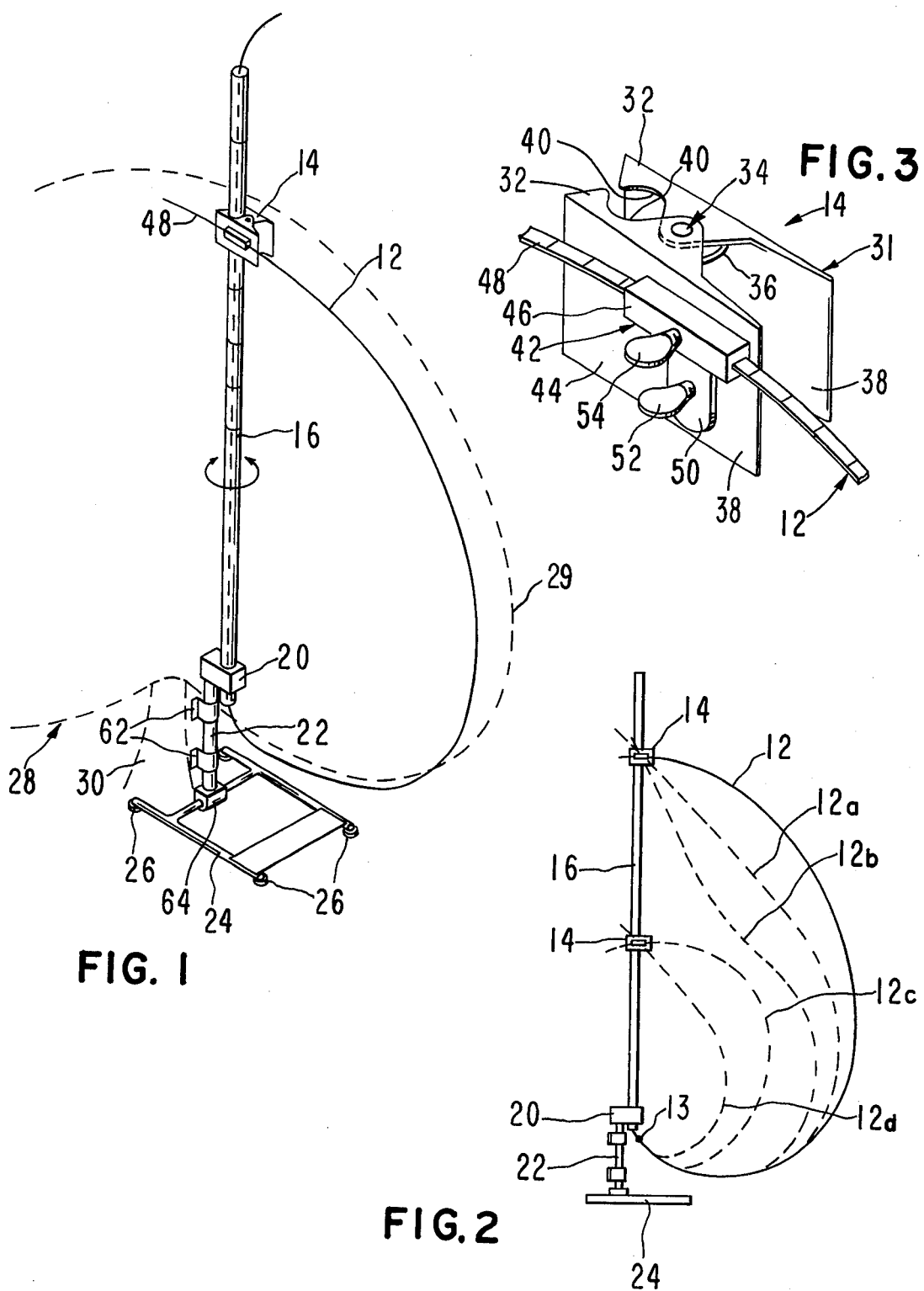

SHRUB TRIMMING GUIDE

This is a continuation of application Ser. No. 510,104 filed Sept. 27, 197 now abandoned.

BACKGROUND OF THE INVENTION

In trimming garden shrubs and the like, it is desirable to have a trimming guide which indicates the amount of growth to be removed and also to indicate a desired configuration which the plant will have as soon as the trimming has been completed. A number of prior patents disclose the idea of shrub trimming guides, among which are U.S. Pat. Nos. 2,478,081; 2,679,691; 2,883,756; and 3,487,614. With the exception of U.S. Pat. No. 2,883,756, all of these patents have structures which limit the configuration of the trimmed shrub to a single outer peripheral shape. In U.S. Pat. No. 2,883,756, a guide made of interconnected, articulated links is disclosed with the member being formed into one of a number of different shapes by articulating the links so that collectively they assume the desired configuration.

The present invention has the following advantages over the previously listed patents:

1. Use of a resilient continuous guide member enables one to define a smooth, variable size and contoured outline for plant trimming, easier and more quickly than the linked member of U.S. Pat. No. 2,883,756 described above.
2. The present submitted trimming guide includes structure which houses the excess length of the guide member, out of the way during the trimming guide operation. Housing the unused portion of the member is particularly desirable when applying the guide to smaller size plants, where a large portion of the member is unused and allows the trimming guide to be easily adjustable to the trimming of a wide range of plant sizes. A disadvantage of U.S. Pat. No. 2,883,756 is that adjustment for plant size requires folding segments of either or both ends of the linked member, which could encumber the trimming operation.
3. The present submitted trimming guide maintains its shape regardless of its position around the outer peripheral margin of a plant. A disadvantage of the linked member of U.S. Pat. No. 2,883,756 is that the shape of the guide can be accidentally changed because the links, when moved or otherwise contacted, will change their positions with respect to each other and thereby change the configuration to which a plant is to be trimmed. This is a problem which is not easily avoided because it is necessary periodically to change the position of the guide so that it moves progressively around the outer periphery of the plant during the trimming operation.

No satisfactory shrub trimming guide has until now been developed which easily and quickly defines and maintains a contoured outline for trimming plants, which allows for variation in shape of this outline, and easily adjusts to a wide range of plant sizes.

SUMMARY OF THE INVENTION

The present invention is directed to an apparatus for use as a guide in trimming plants of different types and sizes, such as small trees, shrubs bushes and the like. The invention utilizes a wire-like guide member of resilient material which can be flexed along its length so that it can be moved into any one of a number of different configurations. The guide member is continuously resilient along its length in contrast to being discontinuous as the case of articulated links of U.S. Pat. No. 2,883,756.

The upper and lower ends of the guide member have means thereon for positioning the same adjacent to the upper and lower extremities of the outer periphery of the plant to be trimmed. Such means includes structure for orienting either the upper or lower end of the guide member at any one of a number of different angles relative to the vertical. Structure at the opposite end of the member houses the guide member, from which is dispensed only that length of guide member required for a given size plant. This allows the trimming guide to be adjustable for the trimming of a wide range of plant sizes. Setting the guide member length dispensed out of its housing, its position relative to the vertical, and its angle relative to the vertical causes the guide member to assume a distinctive configuration relative to the outer peripheral margin of the plant to be trimmed. Thus, a cutting unit, such as hedge trimmers or the like, can be caused to trim the plant in accordance with such configuration. The guide member is then rotated at incremental positions around the outer periphery of the plant for further trimming.

Several embodiments of the apparatus of this invention can be utilized. In one embodiment, a vertical rod or shaft is used, the lower end of the shaft being coupled to a base which rests on the ground adjacent to the trunk of the plant. In another embodiment, the shaft can be carried by a strap unit and the strap unit can be releasably secured to the trunk of the plant.

The shaft can be hollow so that the guide member can be fed downwardly through the shaft, out of the lower end thereof, about the outer peripheral margin of the plant to be trimmed and back to the shaft near the upper end thereof. The hollow shaft would house the excess length of the guide member in addition to holding the lower end of the guide member near the center line of the plant. Means at the upper end of the shaft adjustably secures the guide member to the shaft itself. Such means can include a fastening device of any one of several different forms, each form having means for permitting the guide member to approach the vertical axis of the plant, i.e., the shaft, at any one of a number of different angles. For each angle, the guide member will have a corresponding configuration along its length and such configuration can be readily selected.

In another embodiment of the invention, means can be provided for securing the upper and lower ends of the guide member to a plant without any connection between such upper and lower ends. Thus, a first device can be provided for securing the lower end of the guide member to the trunk of the plant and a second device can be provided to secure the upper end of the guide member to the upper margin of the plant. One of such upper or lower devices is provided with structure to permit the guide member to approach the vertical axis of the plant at any one of a number of different angles to cause the guide member to assume a distinctive configuration.

The primary object of this invention is, therefore, to provide an improved guide for use in trimming plants, such as garden shrubs or the like, wherein the apparatus has a guide member of resilient construction so that it can be caused to assume any one of a number of different configurations by the way it approaches and is positioned relative to a particular dimension of a plant to be trimmed. The member is stored in a housing, such that only that length member required is dispensed allowing the guide to be adjustable to perform on a wide range of plant sizes.

Another object of this invention is to provide guide apparatus of the type described which includes structure for attaching one end of an elongated resilient guide member to a plant in such a way that the guide member approaches the vertical axis of the plant at a specific angle so as to give the guide member a specific configuration which is the desired configuration of the plant when trimming thereof has been completed.

Other objects of this invention will become apparent as the following specification progresses, reference being had to the accompanying drawing for illustrations of several embodiments of the invention.

SUMMARY OF THE DRAWINGS

FIG. 1 is a perspective view of one embodiment of the apparatus of the present invention;

FIG. 2 is a side elevational view of the apparatus illustrating in dashed lines the various possible configurations of the resilient guide member thereof;

FIG. 3 is an enlarged, perspective view of the device for adjustably coupling the guide member to the vertical shaft of the apparatus;

Figure 4:
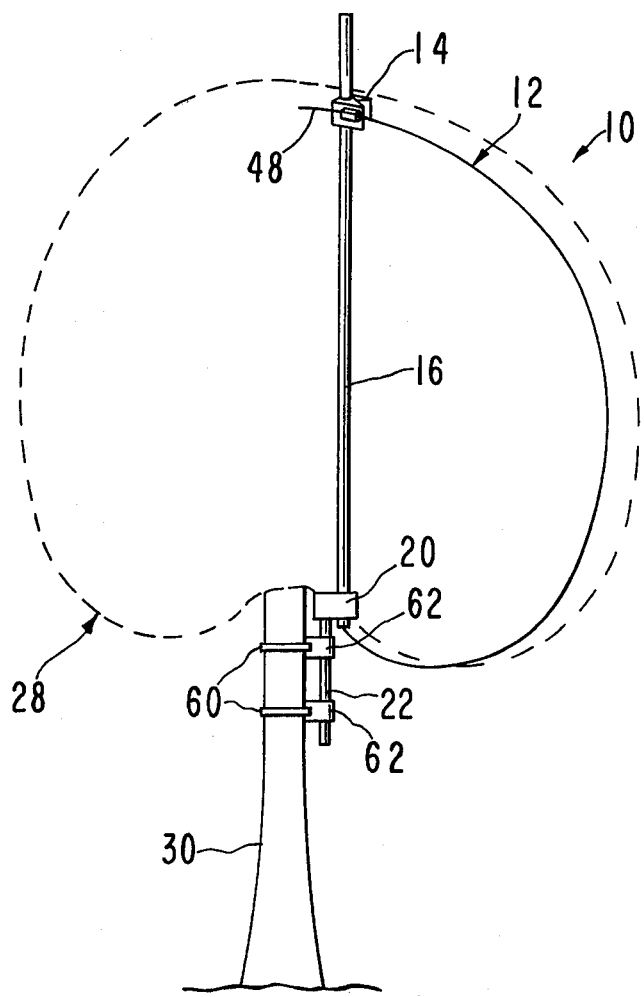
FIG. 4 is a side elevational view of the apparatus of FIG. 1 showing the way in which it can be strapped to the trunk of a tree.

A first embodiment of the apparatus of this invention is broadly denoted by the numeral 10 and includes an elongated, flexible, resilient guide member 12 which comprises a single strand of material such as spring steel or the like. Guide member 12 is adjustably coupled by a device 14 to a hollow rod or shaft 16 near the upper end of the latter. The shaft has upper and lower open ends so that the guide member can be carried by and extend through shaft 16 for storage of the excess length of the guide member since the guide member is of sufficient length to allow adjustment of the guide to perform on a wide range of plant sizes. The guide member when in use extends out of the lower end of shaft 16. Shaft 16 frictionally holds one end of the guide member 12 within the interior of the shaft as device 14 holds the other end in position along the longitudinal axis of the shaft.

The lower end of shaft 16 extends through a support segment 20 which supports and allows shaft 16 to rotate freely. The support segment 20 is carried at the upper end of a support member 22 removably secured in any suitable manner, such as by a block 64, to a base 24. The base has adjustable feet 26 thereon for resting on the ground beneath a plant, shrub, bush or the like to be trimmed, the plant being denoted by the numeral 28 and having a trunk 30. Base 24 is shaped to allow support member 22 to be quite close to trunk 30 so that shaft 16 will be in proximity to and substantially parallel with the vertical axis of the plant. While shaft 16 will not necessarily be at the center of plant 28, it will be sufficiently close to the center to assure good results when guide member 12 is used as a guide to trim the outer periphery 29 of the plant with a cutting unit (not shown), such as hand-held or electrically-actuated shears.

A first embodiment of device 14 is shown in detail in FIG. 3. It includes a spring clip unit 31 having a pair of jaws 32 which pivot about a hinge pin 34 and are biased toward each other by a coil spring 36 surrounding pin 34. A pair of extensions 38 opposed to jaws 32 permit the jaws to be manually opened so that they can embrace shaft 16 in the manner shown in FIG. 1. Each jaw 32 has a concave recess 40 for engaging the adjacent outer peripheral surface portion of shaft 16. Also, device 14 can be rotated about shaft 16 as jaws 32 engage the shaft.

The clamping element 42 is pivotally carried on one side 44 of device 14 as shown in FIG. 3. Element 42 includes a hollow segment 46 for shiftably receiving the upper end portion 48 of guide member 12, and a rigid extension 50 secured to segment 46 and extending laterally therefrom. A screw 52 pivotally mounts extension 50 to device 14 and releasably clamps extension 50 to side 44 so that segment 46 can be moved into any one of a number of angular positions relative to shaft 16. A screw 54 releasably clamps end portion 48 of guide member 12 against movement relative to segment 46.

FIG. 2 illustrates several operative positions of guide member 12 which are dependent on the length of the guide member 12 dispensed out of shaft 16, the vertical position of device 14 on shaft 16, and the angle which the longitudinal axis of segment 46 makes with the longitudinal axis of shaft 16. Generally, the length of guide member 12 required and the vertical position of device 14 on shaft 16 is determined by the size of the plant and by the amount of growth desired to be trimmed, as can be seen in FIG. 2 at positions of guide member 12 at the full line position and at 12c. Adjustment of both the length of guide member 12 dispensed out of shaft 16 and the vertical position of device 14 can also give variations in configurations for trimming. Changes in trimming configurations can also be obtained by changing the angle of the longitudinal axis of segment 46. When segment 46 is in a generally horizontal position, guide member 12 will be generally in the full-line position of FIG. 2. Similarly, as segment 46 becomes more inclined, guide member 12 will assume other configurations, such as those identified by numerals 12a, 12b and 12d. The inherent resilience of guide member 12 causes the same to assume a distinctive configuration along its length corresponding to a particular angle which segment 46 makes with the vertical. Thus, to change such configuration, one merely needs to change the angle of segment 46 with respect to the vertical.

Guide member 12 can be of any desired cross section. For purposes of illustration, it is substantially rectangular in cross section as shown in FIG. 3. However, it can be circular, hexagonal and other shapes depending upon what is commercially available. It is sufficient if the guide member is continuous and resilient along its length.

In use, the base structure which includes 20, 22 and 24 is placed adjacent to trunk 30 of the plant to be trimmed. Shaft 16 is then inserted down through the top center of the plant and onto support segment 20 so that, when base 24 is in the position of FIG. 1, shaft 16 will be adjacent to and substantially vertical, i.e., substantially parallel to the central axis of the plant. Then, guide member 12, which initially will be housed or stored in shaft 16, is forced downwardly, out through the bottom open end of shaft 16, then beneath the bottom portion of the plant, then up along the side and back towards the top of the plant. The guide member will ordinarily be within the plant since the outer periphery of the plant is to be trimmed. The depth to which the guide member will be disposed will depend upon how much growth is to be removed from the plant.

Device 14 is then manually adjusted along shaft 16 depending upon the desired height to which the plant is to be trimmed. Also, segment 46 on device 14 is adjusted so that the angle which it makes with the vertical will cause guide member 12 to have a specific configuration. For example, the guide member can have any one of the operative positions shown in FIG. 2.

When the guide member is properly positioned, cutting of the plant can be commenced and the growth on the outer periphery of the plant is cut along the contour as defined by the position of guide member 12 to the depth at which the guide member is disposed. Guide member 12 is then rotated into a new operative position around the periphery of the plant and the trimming is continued. This is done by manually rotating device 14 to the new position, such as 45°, 90° or 180° away from the original position. Shaft 16 may be provided with spaced marks (FIG. 1) along the same so that device 14 can be accurately placed at its original position along the shaft after the guide member has been moved to a new position. At times, it may be desirable to move the complete trimming guide to a new location around the periphery of the plant, e.g. to the opposite side of the plant shown in FIG. 1. A slider 13 may be attached to guide member 12 as shown in FIG. 2 to facilitate in returning the guide member to its original position relative to shaft 16 if it is desired to reposition the complete trimming guide. The slider can be releasably held to the guide member by a set screw or clip. In lieu of a slider, marks (not shown) can be provided along the length of the guide member.

Apparatus 10, as shown in FIG. 4, can be used without base 24 by securing support member 22 by a pair of straps 60 to the trunk 30 of plant 28 to be trimmed, such as a small tree whose trunk 30 is quite long in length when compared with a trunk of a relatively short bush of the type shown in FIG. 1. Straps 60 are secured by respective brackets 62 to support member 22, the latter being removed from base 24. Brackets 62 can be permanently attached to support member 22 if desired.

Figure 5:
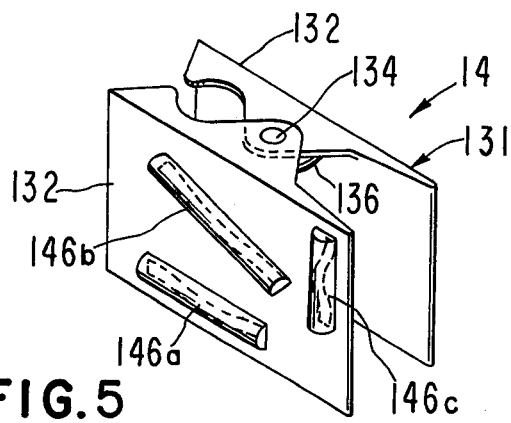
FIGS. 5–8 are different embodiments of the device for securing the upper end of the guide member to the shaft of FIGS. 1 and 4.

FIGS. 5–8 show other embodiments of device 14 for securing the upper end of guide member 12 at adjustable angles to shaft 16, thus enabling variation in the shape of the guide member and thereby the configuration of the plant. FIG. 5 shows a spring clip unit 131 which is of the same construction as clamping unit 31 of FIG. 2. It has a pair of jaws 132 pivotally mounted by a pin 134 for movement toward and away from each other. A coil spring 136 biases the jaws together. Unit 131 has a number of tubular projections 146a, 146b and 146c, each of the projections being adapted to receive and frictionally engage the corresponding end portion of guide member 12, yet the projections are all at different angles with respect to each other. While only three such projections are shown, it is understood that there could be more such projections if desired. Each projection has a pair of open ends so that the guide member can be easily inserted into or removed from the projection.

Figure 6:
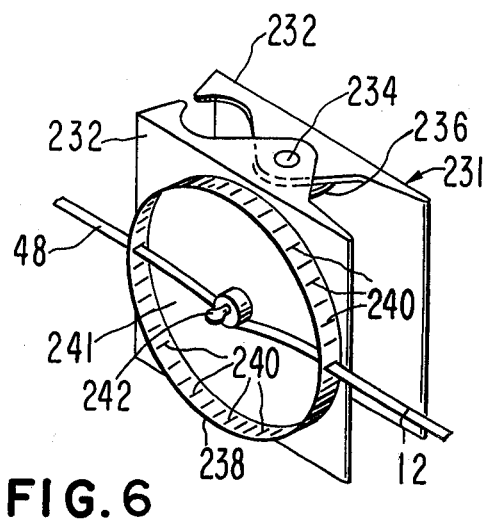

FIG. 6 shows a spring clip unit 231 of the same construction as clamping units 31 and 131. It has a pair of jaws 232 mounted for pivotal movement about a pin 234 and biased toward each other by a coil spring 236. Unit 231 has a ring 238 at one side thereof, the ring having a plurality of axially extending, diametrically opposed pairs of slots 240 therethrough. Thus, end portion 48 of guide member 12 can extend through a pair of aligned slots 240 and be held by a cam shaped element 242 which can be rotated to exert pressure against and thus hold end portion 48 of guide member 12 in place. The ring is on a disk 241 secured to one side of unit 231. Also, the pairs of slots are angularly disposed relative to each other.

Figure 7:
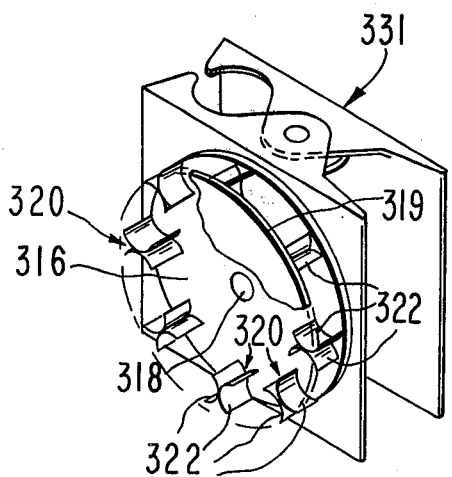

The embodiment of FIG. 7 includes a spring clip unit 331 having the same construction as the clip units of FIGS. 3, 5 and 6. Unit 331 has a disk 316 secured by a pin 318 to one side thereof. Disk 316 has a plurality of pairs of relatively small clips 320 at diametrically opposed locations thereon, each clip having a pair of separable, spring-like retaining members 322 which permit end portion 48 of guide member 12 to pass therebetween. Thus, the guide member will frictionally engage clip member 322 and be releasably held thereby. The pairs of clips 320 are at different angles with respect to each other, thereby permitting guide member 12 to assume any one of a number of different configurations when unit 331 is used. An outer plate 319 is placed over the clips to prevent lateral slippage of the end portion 48 of guide member 12 off the clips.

Figure 8:
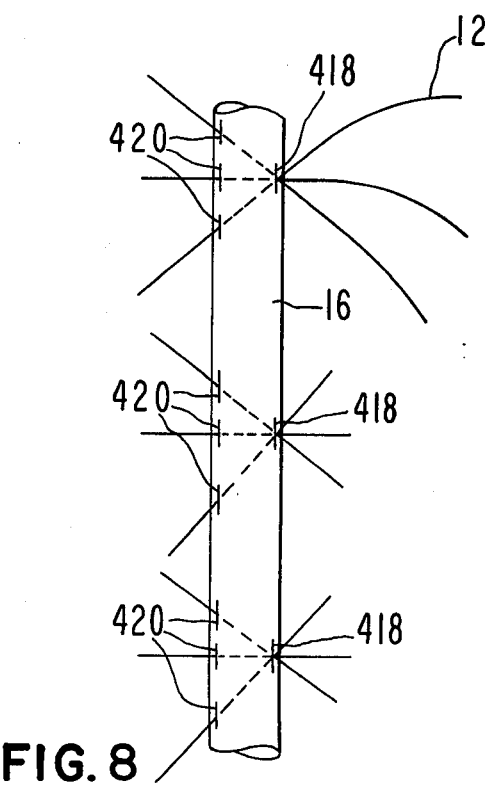

FIG. 8 shows a segment of shaft 16 with the segment having a number of slots therein at each of a plurality of longitudinally spaced locations along the length of the shaft. For instance, the upper group of slots includes a first slot 418 and a number of longitudinally spaced second slots 420, the slots extending through the wall of the shaft. For instance, guide member 12 can extend through a slot 418 and then through any one of the other slots 420 so that the guide member will approach and make a predetermined angle with respect to the longitudinal axis of shaft 16. By spacing the groups of the slots along the length of shaft 16, the apparatus can be used with plants of different heights.

While the foregoing discussion has been made with respect to the use of adjustable device 14 near the upper end of the plant to be trimmed, it is possible to use such an adjustable device at the lower end thereof. Also, it is possible to use a pair of such adjustable devices at both the upper and lower ends of the plant to get other possible types of configurations for member 12. Basically, the angle at which either or both ends of the guide member approaches shaft 16 or approaches the central axis of the plant to be trimmed can define a specific configuration of the guide member and thereby the configuration of the plant after it has been trimmed. The fact the guide member is resilient along its entire length allows it to assume various configurations, depending on the way it approaches shaft 16.

What is claimed is:

1. Apparatus for use in trimming a plant having growth defining an outer peripheral margin therefor comprising: a rod having means adjacent to one end thereof for positioning the same adjacent to the central part of a plant to be trimmed with the rod extending from a first location near the lower part of the growth to a second location near the upper part of the growth; an elongated, resilient member of one-piece construction adapted to extend along and adjacent to the outer peripheral margin of the plant to provide a guide for a cutter to shorten the growth at said outer peripheral margin, said rod including means for housing at least a part of said member and for allowing the member to pay out from a first end of the rod, to return to said housing means, and to extend along and adjacent to said outer peripheral margin from a position near the first end of the rod to a position near the second end of the rod; and second means adjacent to the second end of said rod for adjustably securing the member thereto.

2. Apparatus as set forth in claim 1, wherein said positioning means is adjacent to the lower end of said rod for positioning the same adjacent to the trunk of said plant, said first end of of the rod being the lower end thereof, said second means having structure for adjusting the angle at which the member approaches the rod.

3. Apparatus as set forth in claim 1, wherein said rod is hollow and is open at said first end to permit the member to pass therethrough and to be housed therein, said member frictionally engaging said rod near said first end when said member extends along and adjacent to said outer peripheral margin.

4. Apparatus as set forth in claim 1, wherein said second means has structure thereon for adjusting the angle at which the member approaches the rod.

5. Apparatus as set forth in claim 1, wherein said second means includes a spring clip, and means pivotally mounted on the clip for releasably securing said member thereto.

6. Apparatus as set forth in claim 1, wherein said second means comprises a body adapted to be fastened in a fixed position to the upper end of said plant, said body having a side provided with a number of tubular projections, said projections being angularly disposed relative to each other for removably receiving the upper end of said member.

7. Apparatus as set forth in claim 1, wherein said second means includes a ring having a plurality of slots therethrough for receiving the upper end of said member.

8. Apparatus as set forth in claim 1, wherein said second means comprises a disk having a plurality of spring retainers on the outer periphery thereof, said member adapted to be coupled with any one of said retainers.

9. Apparatus as set forth in claim 1, wherein said second means comprises an elongated member having a number of passages therethrough, said passages defining respective paths which are angularly disposed relative to each other.

10. Apparatus as set forth in claim 1, wherein said positioning means includes a base adapted to be positioned on the ground beneath said plant, said rod being coupled to said base and extending upwardly therefrom.

11. Apparatus as set forth in claim 1, wherein said rod is rotatably mounted on said positioning means.

12. Apparatus as set forth in claim 1, wherein said positioning means includes structure adapted to be placed in a fixed position relative to the plant, said rod being rotatably mounted on said structure.

13. Apparatus for use with a plant having growth to be trimmed with the growth defining an outer peripheral margin of the plant comprising: a generally hollow rod having an open end; means engageable with the rod for supporting the same in an operative position adjacent to the central part of a plant whose outer peripheral growth is to be trimmed; an elongated, resilient, one-piece member normally housed in the rod and movable out of the open end thereof, said member adapted to be moved out of said open end of the housing and to extend along and adjacent to the outer periphery of the plant when the rod is in said operative position so that the member provides a guide for a cutter as the latter operates to trim said growth; and an adjustable clamp coupled to the member for connecting the same to the rod adjacent to the opposite end thereof, said clamp having means for adjusting the angle at which the member approaches the rod, the rod frictionally engaging the member near said open end so that the member is effectively releasably held in place adjacent thereto as the member extends along and adjacent to said outer periphery.

* * * * *